Figure 1:
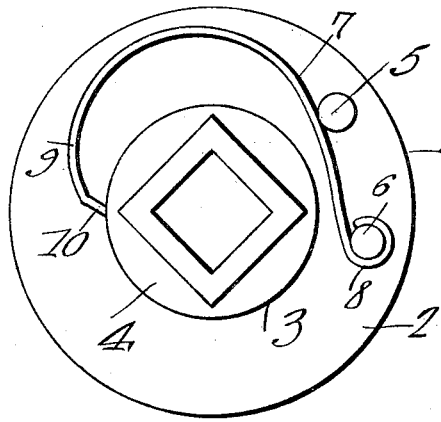

M. F. GOSSWILLER.
BOLT LOCK.
APPLICATION FILED MAY 27, 1913.

1,103,902.

Patented July 14, 1914.

Witnesses

M. F. Gosswiller
Inventor
by
Attorneys

UNITED STATES PATENT OFFICE.

MICHAEL FRANCIS GOSSWILLER, OF TROY, MONTANA, ASSIGNOR OF ONE-HALF TO WALTER BISSELL, OF TROY, MONTANA.

BOLT-LOCK.

1,103,902.  Specification of Letters Patent.  Patented July 14, 1914.

Application filed May 27, 1913. Serial No. 770,232.

*To all whom it may concern:*

Be it known that I, MICHAEL F. GOSSWILLER, a citizen of the United States, residing at Troy, in the county of Lincoln and State of Montana, have invented a new and useful Bolt-Lock, of which the following is a specification.

This invention relates to improvements in bolt locks and more particularly to means whereby grease cup compressors will be locked against unscrewing and at the same time allowed to turn freely in the opposite direction.

An object of the present invention is to provide a spring member bent in the outline of a spiral and with the inner end thereof notched so as to engage the threaded portion of the compressor of a grease cup, the rotation of the grease cup in one direction forcing the spring member outwardly therefrom and any rotation in the opposite direction tending to wrap the spring therearound, which will effectually prevent the said rotation.

A further object is to provide a spring member in the form of a narrow strip of metal and to provide the inner contacting end thereof with grooves or threads and to bend the said end sharply inward so that when the compressor or bolt tends to move outwardly or unscrew, the extreme transverse face of the spring member will be angularly disposed with respect to the peripheral surface of the compressor or bolt so that the sharpened edge of the spring member will contact with the threads of the bolt or compressor and prevent the rotation thereof in the direction stated.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 2:
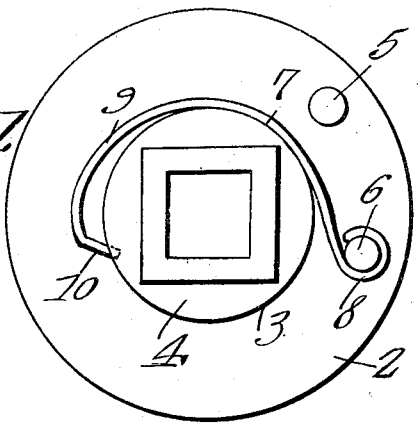
Figure 3:
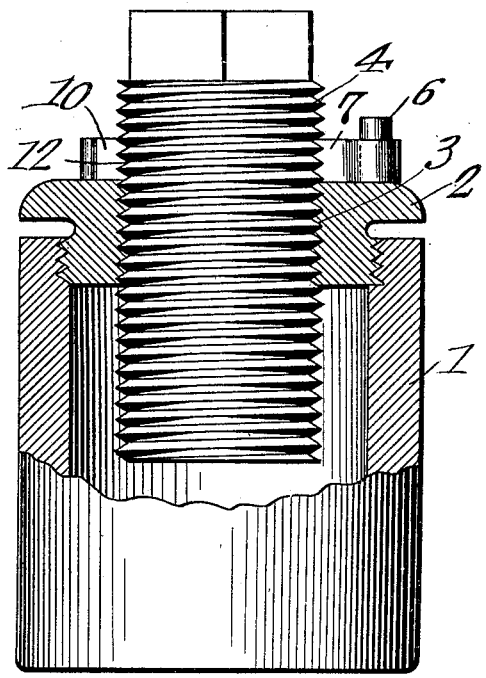
Figure 4:
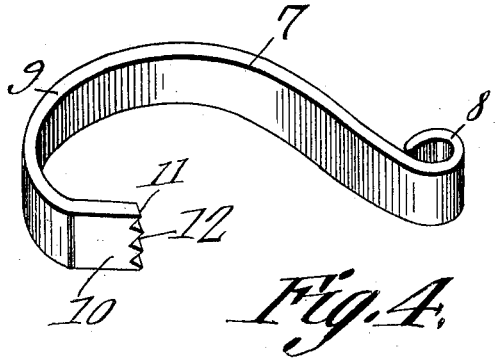

Figure 1 is a top plan view of a grease cup and threaded bolt-like compressor and with my improved locking means secured thereto, the spring member being in the position assumed when the compressor is turned clockwise. Fig. 2 is a similar view showing the spring member as the bolt-like compressor is turned counter-clockwise. Fig. 3 is a view in elevation of a compressor and grease cup with portions thereof broken away. Fig. 4 is a perspective view of the spring locking member.

Referring to the drawings in which similar reference numerals designate corresponding parts throughout the several views, 1 is a grease cup threadedly secured to which is the cap 2. The cap is provided with a central threaded aperture 3 through which extends the threaded compressor 4. Attention is here called to the fact that with the locking means as herein described it is not necessary to in any way mutilate or change the construction of the compressor but it may be used substantially in the form as found in practice. The cap 2 is provided with two upwardly extending pins 5 and 6 secured thereto and which pins are spaced some little distance apart and also away from the threaded aperture 3 of the cap. The locking member as illustrated in Fig. 4 comprises a shank or body portion 7 the end of which is curled as at 8, the curled portion fitting over the pin 6 and held thereby. The spring locking member is formed of a strip of metal and is bent after the manner of a spiral to form the loop or hook-shaped portion 9 and the inwardly extending end 10, the transverse face 11 of which is provided with the grooves 12 extending thereacross. The spring locking member is positioned upon the cap 2 with the curled portion 8 thereof engaging the upstanding pin 6 and the outer free end 10 engaging the bolt or compressor at a point substantially diametric with respect thereto. The spring holding member is so bent prior to its insertion upon the cap so that it is necessary to spring the same over the bolt which provides a constant tension upon the end 10 of the spring tending to force the same into engagement with the threads of the compressor. The teeth 12 of the spring member are adapted to engage the threads of the compressor, to allow the rotation of the compressor in one direction and preventing the rotation thereof in the opposite direction.

Figs. 1 and 2 of the drawings illustrate the position of the locking member before and after attempting the rotation of the compressor in a direction which the holding member is adapted to prevent. In Fig. 1 the end 10 is removed from the pin 6 approximately 180 degrees and the squared face 11 of the holding member lies substantially tangential to the periphery of the compressor threaded surface. When the compressor is rotated in a counter clockwise direction which direction will tend to unscrew the compressor the body portion or shank 7 is drawn downwardly against the surface of the compressor and the end 10 passes beyond the diametric point and the transverse face 11 assumes a position at an angle to the peripheral surface of the compressor so that the meeting and sharpened edge between the side and end walls of the holding member will contact with and tend to bite into the material of which the compressor is formed and thereby securely and positively lock the compressor against rotation in this direction, it being noted that the more force exerted upon the compressor to rotate the same in the direction indicated, the greater will be the holding or reactive force of the holding or locking member, these positions being illustrated in Fig. 2. The pin 5 is positioned as illustrated and is so arranged as to prevent excessive movement of the spring holding member when the compressor is moved in a clockwise direction which it is allowed to do so that grease and other material which may be disposed within the cup 1 is successfully ejected therefrom.

The threaded end of the locking member is adapted to keep the threads of the bolt or compressor clean as the same is rotated downwardly into the cup. Furthermore with the locking member as I have described, the compressor is locked against rotation in one direction at any position so that when it is desired to move the compressor downwardly it is merely necessary to so do, the locking member immediately assuming a locked position should there be any tendency for a counter rotation of the said compressor. When it is desired to remove the compressor so that the grease cup may be refilled by exerting a suitable force upon the end 10 of the locking member, the same will be moved away from and out of contact with the compressor which allows the same to be freely rotated as desired.

One of the particular advantages accruing from the construction as I have outlined the same, lies in the fact that the locking means may be easily installed upon any grease cup or similar article already in use and does not require any mutilation of the threads thereof, it being noted that those locking members requiring a groove to be cut in the side of the bolt or compressor allow the grease or material disposed within the cup to escape therethrough. The use of a locking member such as I have described takes the place of lock or jam nuts which when subjected to sudden jars, etc., are liable to work loose. Furthermore the greater the force tending to rotate the bolt or compressor in one direction, the greater will be the reactive force exerted thereagainst. The locking means such as I have described, may be used with bolts or rods threaded in a right or left handed direction, the only change being the change in position of the spring holding member. It is to be noted that the locking means as I have provided in combination with a compressor may be used with equal advantageous results with bolts and threaded rods, it being illustrated with a compressor as with an article of this class it is desirable that the threads of the compressor remain in a continuous condition and the providing thereof with grooves, etc., being extremely objectionable.

Having thus fully described the present invention what I claim is:—

The combination of a bolt, a nut, and a resilient spiral spring member, the said nut provided with an upright post, a second post spaced a distance away from the first mentioned post and supported by the said nut, the said spiral resilient spring member carried by the first mentioned post, the opposite end of said spiral spring member bent sharply inward and normally resiliently engaging the bolt, the extreme free end of said spiral spring member sharpened and adapted to bite into the bolt threads, the relative rotation of the bolt and nut in one direction forcing the spring member away from the bolt threads, the said resilient spiral member held against disengagement therefrom by means of the second post, the opposite relative rotation of the bolt and nut tending to draw the spring member into forced and frictional contact with the bolt for the prevention of such rotation.

In testimony that I claim the foregoing as my own, I have hereto affixed my signature in the presence of two witnesses.

MICHAEL FRANCIS GOSSWILLER.

Witnesses:
 HARRY D. WEBSTER,
 GEO. COFFMAN.

Copies of this patent may be obtained for five cents each, by addressing the "Commissioner of Patents, Washington, D. C."